(12) United States Patent
Backman et al.

(10) Patent No.: US 7,035,916 B1
(45) Date of Patent: Apr. 25, 2006

(54) COUPLING A FILTER GRAPH SPACE TO A NETWORK DRIVER SPACE

(75) Inventors: Terje K. Backman, Carnation, WA (US); Thaddeus C. Pritchett, Edmonds, WA (US); Peter F. Porzuczek, Carnation, WA (US); John A. Elliott, IV, Kirkland, WA (US); Sivaramakrishnan Rajagopalan, Bellevue, WA (US); Patrick C. O'Hanlon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/561,382

(22) Filed: Apr. 27, 2000

Related U.S. Application Data

(60) Provisional application No. 60/182,926, filed on Feb. 16, 2000.

(51) Int. Cl.
*G06F 15/177* (2006.01)

(52) U.S. Cl. .................. 709/220; 709/227; 709/217; 709/221; 709/222; 719/310; 719/321

(58) Field of Classification Search ............. 709/220; 707/101; 719/321
See application file for complete search history.

(56) References Cited

U.S. PATENT DOCUMENTS

| | | | | | |
|---|---|---|---|---|---|
| 5,675,793 | A | * | 10/1997 | Crick et al. ................... | 713/1 |
| 5,916,309 | A | * | 6/1999 | Brown et al. ................. | 710/52 |
| 6,016,515 | A | * | 1/2000 | Shaw et al. ................. | 719/321 |
| 6,209,041 | B1 | * | 3/2001 | Shaw et al. ................. | 719/321 |
| 6,594,773 | B1 | * | 7/2003 | Lisitsa et al. ............... | 713/600 |

OTHER PUBLICATIONS

Saravan Kumar K.B., Logambal V.: "WDM Viedo Streaming Filter Driver," Online! Nov. 26, 1999, pp. 1-32, XP002215606, retrieved from the Internet: <URL:http://www.calsoft.co.in/feedback/genloginchek.asp?fname:wdm.pdf> retrieved on Oct. 3, 2002!.

* cited by examiner

*Primary Examiner*—Ayaz Sheikh
*Assistant Examiner*—Syed A. Zia
(74) *Attorney, Agent, or Firm*—Lee & Hayes, PLLC

(57) ABSTRACT

A communication path is established that allows for communication between a filter graph space and a network driver space in a system. The communication path allows bi-directional communication between a filter graph driver in the filter graph space and a network driver in the network driver space. Addresses of data can be passed from the network driver to the filter graph driver, which allows the filter graph driver to communicate with a filter graph manager as necessary to configure the filter graph space to obtain data from the requested address. The data obtained from the address is then passed from the filter graph driver to the network driver.

26 Claims, 8 Drawing Sheets

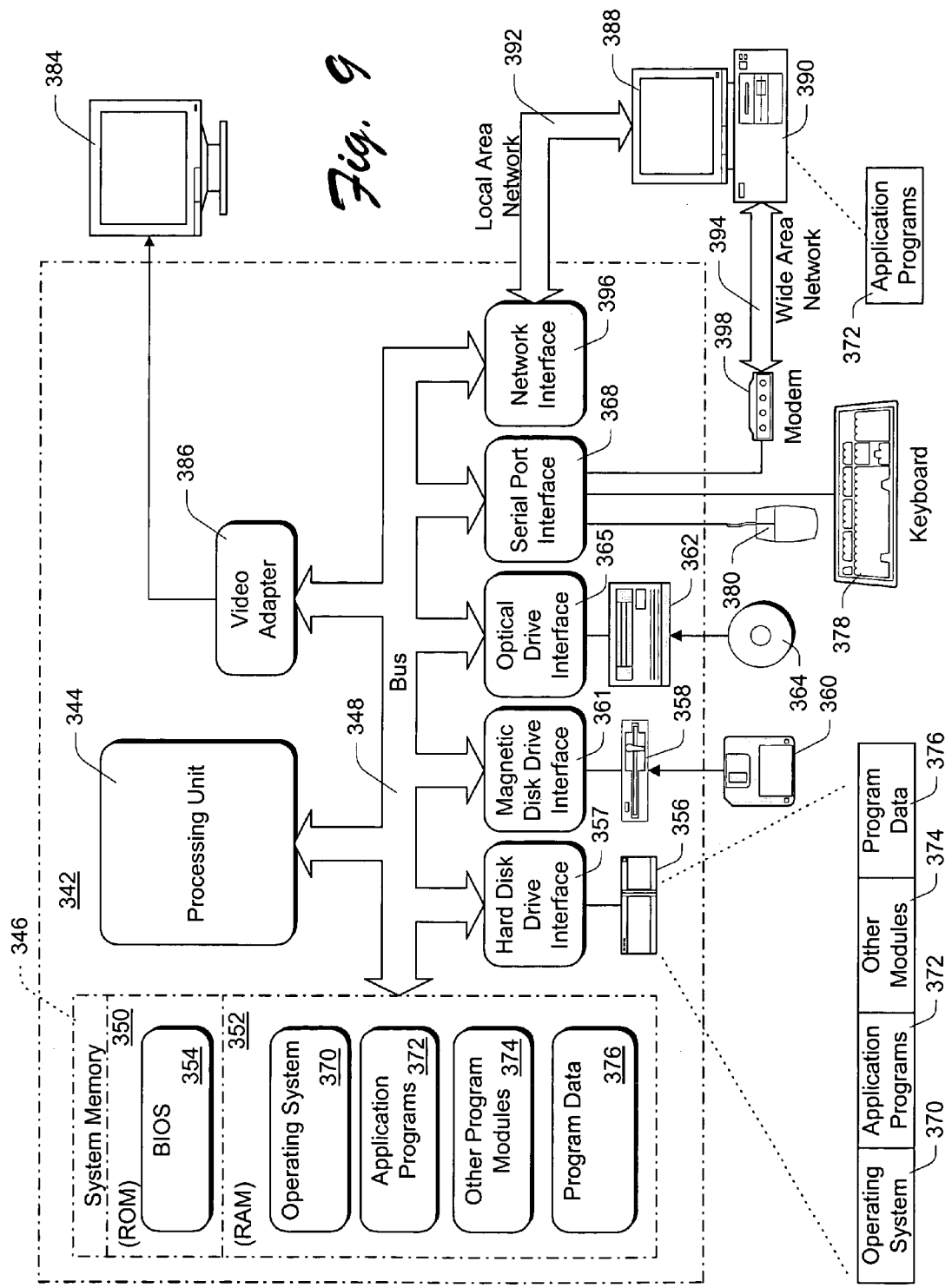

COUPLING A FILTER GRAPH SPACE TO A NETWORK DRIVER SPACE

RELATED APPLICATIONS

This application claims the benefit of U.S. Provisional Application No. 60/182,926, filed Feb. 16, 2000, entitled "Coupling a Filter Graph Space to a Network Driver Space", to T. K. Backman, T. C. Pritchett, Peter Porzuczek, John Elliott IV, Sriram Rajagopalan, Patrick O'Hanlon.

TECHNICAL FIELD

This invention relates to device drivers, and more particularly to coupling together a filter graph space and a network driver space.

BACKGROUND OF THE INVENTION

It has become common for devices to receive multimedia content from a variety of different sources and via a variety of different network types. For instance, a television may receive multimedia content from one or more cable systems or satellite systems and also from terrestrial broadcast systems. More recent devices such as set-top boxes (STBs) and multimedia personal computers (PCs) are able to receive programming from cable systems, terrestrial broadcast systems, satellite systems, the Internet, etc.

A device receiving multimedia content typically includes a receiver driver implemented in software or firmware that may work in conjunction with corresponding hardware to "tune" to particular content (a particular channel, a particular file server, etc.). Various functions are carried out by the receiver driver in order to tune to a particular program depending on the nature of the network type. Examples of such functions include radio frequency (RF) tuning, demultiplexing, decrypting, etc.

The multimedia content that is received by a device can include video content, audio content, and data content. The video and audio content typically refer to conventional video and audio programming (e.g., television shows, radio broadcasts, movies, etc.). The data content typically refers to additional data that corresponds to the video and audio programming, such as sports player statistics, program sponsor information, etc. A current trend in multimedia content delivery is to include the data content in a format that current computers are familiar with, such as the Internet Protocol (IP) format.

The manner in which data content is transmitted to a device depends on the network type being used to transmit the multimedia content. For example, if the network type is a terrestrial analog broadcast then the data content can be included in the vertical blanking interval (VBI) of the broadcast. By way of another example, if the network type is a satellite digital broadcast, then the data content can be included in a separate channel or sub-channel of the broadcast.

One way in which multimedia content can be tuned to and rendered by a device is by use of the DirectShow® architecture, which is an architecture that controls and processes streams of multimedia data through one or more filters. Many current devices, on the other hand, process IP data in accordance with other specifications, such as the Network Device Interface Specification (NDIS). Additional information regarding the DirectShow® architecture and NDIS is available from Microsoft Corporation of Redmond, Wash.

In current devices, there is typically no ability for filters of the DirectShow® architecture and NDIS device drivers to communicate with one another. This prevents, for example, applications interfacing with the NDIS device drivers from communicating commands or requests to the filters of the DirectShow® architecture, and further hinders the ability of the DirectShow® architecture filters to communicate IP data to the NDIS device drivers.

The coupling together of a filter graph space and a network driver space described below addresses these and other disadvantages.

SUMMARY OF THE INVENTION

The coupling together of a filter graph space and a network driver space is described herein. A communication path is established that allows for communication between the filter graph space and the network driver space.

According to one aspect, the communication path allows bi-directional communication between a filter graph driver in the filter graph space and a network driver in the network driver space. Addresses of desired data can be passed from the network driver to the filter graph driver, which allows the filter graph driver to communicate with a filter graph manager to configure the filter graph space as necessary in order to obtain data from the desired address. The data obtained from the address is then passed to the filter graph driver and then to the network driver.

According to another aspect, bi-directional communication between a filter graph driver in the filter graph space and a network driver in the network driver space is established by each driver creating a virtual function table (V-Table). The address of the filter graph driver V-Table is passed to the network driver, thereby allowing the network driver to access functions identified in the filter graph driver V-Table. Similarly, the address of the network driver V-Table is passed to the filter graph driver, thereby allowing the filter graph driver to access functions identified in the network driver V-Table.

According to another aspect of the invention, an application can communicate with a device driver in the network driver space via a protocol stack and a network interface. The device driver can then communicate requests from the application to a filter in the filter graph space via the communication path. Thus, the application is able to indirectly control the filter graph space without being able to directly access the filter graph space and with little or no knowledge of how the filter graph space operates (or whether it even exists).

BRIEF DESCRIPTION OF THE DRAWINGS

The present invention is illustrated by way of example and not limitation in the figures of the accompanying drawings. The same numbers are used throughout the figures to reference like components and/or features.

FIG. 9 shows a general example of a computer that can be used in accordance with the invention.

DETAILED DESCRIPTION

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs).

Figure 1:
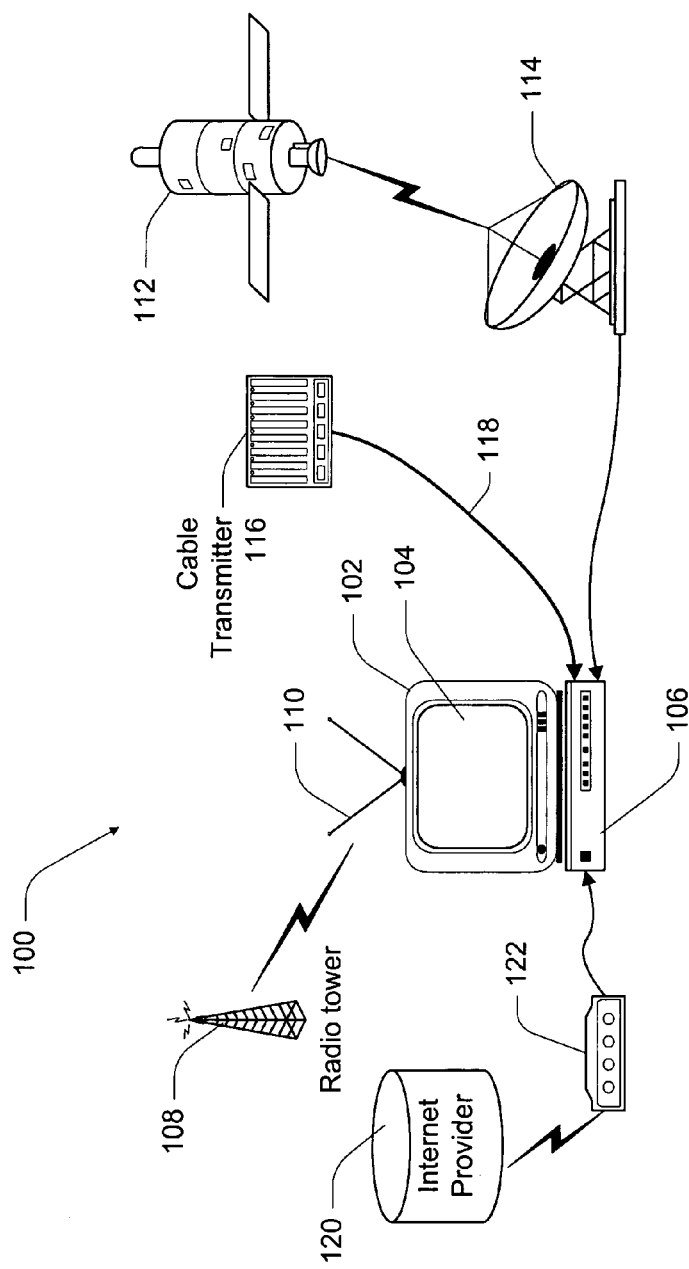
FIG. 1 shows an entertainment distribution and viewing system in accordance with certain embodiments of the invention.

FIG. 1 shows an entertainment distribution and viewing system 100 in accordance with certain embodiments of the invention. Entertainment system 100 includes a video and audio rendering system 102 having a display device including a viewing area 104. Video and audio rendering system 102 represents any of a wide variety of devices for playing video and audio content, such as a traditional television receiver, a personal computer, etc. Receiver 106 is connected to receive and render content broadcast from one or more different programming sources. Although illustrated as separate components, rendering system 102 may be combined with receiver 106 into a single component (e.g., a personal computer or television).

FIG. 1 shows several different physical sources of programming transmitted via different network types, including a terrestrial television broadcasting system 108 which can broadcast analog or digital signals that are received by antenna 110; a satellite broadcasting system 112 which can transmit analog or digital signals that are received by satellite dish 114; a cable signal transmitter 116 which can transmit analog or digital signals that are received via cable 118; and an Internet provider 120 which can transmit digital signals that are received by modem 122. Both analog and digital signals can include audio, video, and/or data content. Other programming sources might be used in different situations, including interactive television systems.

Each of these programming sources broadcasts or otherwise provides one or more content sources. The most familiar example of a content source is a traditional RF television broadcast channel, which is typically occupied by a particular broadcast network such as ABC, CBS, NBC, etc. In the last several years, a great number of such broadcast networks have become available through cable television and satellite providers. Newer content sources are also becoming available, such as servers streaming media over the Internet. Streaming media server content sources provide Internet address or other identifier (e.g., a uniform resource locator (URL)) to allow the sources to be tuned to by receiver 106. Each of these broadcast content sources is associated with a particular broadcast channel, which in turn is identified by a channel number. More recently, systems are being developed in which broadcast content sources are associated with channels that are identified by channel name.

Figure 2:
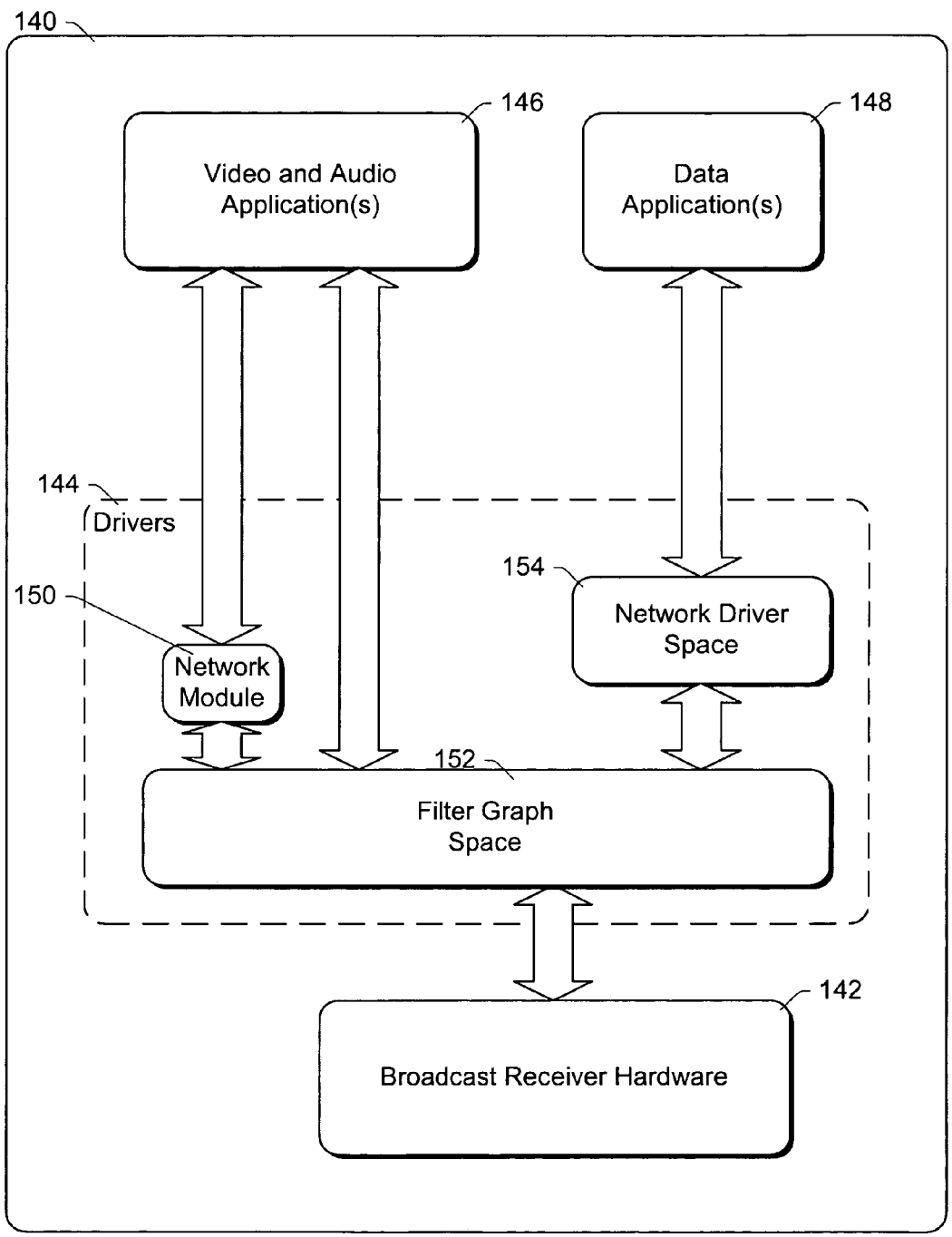
FIG. 2 is a block diagram illustrating an exemplary system for receiving and rendering multimedia content in accordance with certain embodiments of the invention.

FIG. 2 is a block diagram illustrating an exemplary system for receiving and rendering multimedia content in accordance with certain embodiments of the invention. A system 140 is illustrated including broadcast receiver hardware 142, drivers 144, one or more video and/or audio applications 146, and one or more data applications 148. System 140 can be, for example, a rendering system 102 and/or receiver 106 of FIG. 1.

Broadcast receiver hardware 142 includes various hardware components for receiving, tuning, and extracting multimedia content from received signals. Broadcast receiver hardware 142 works in combination with, and is controlled at least in part by, drivers 144. Various types of conventional components can be included in receiver hardware 142, the exact nature of which is dependent on the programming sources that system 140 is to be tuned to and the network types system 140 is to support.

Drivers 144 include network module 150 (also referred to as a "network provider"), a filter graph space 152, and a network driver space 154. Network driver space 154 includes one or more device drivers that communicate with data applications 148 in a conventional manner via an interface and a protocol stack. By using such an interface, the individual applications and/or protocol stacks are alleviated of the burden of having specific knowledge regarding the underlying device drivers. In one implementation, the interface conforms to the Network Device Interface Specification (NDIS) version 5.0 or other versions.

Filter graph space 152, on the other hand, includes one or more filters or components (e.g., Component Object Model (COM) objects) referred to collectively as a filter graph. Each filter or component performs a specific task(s) and exposes at least one "pin". A pin (e.g., another COM object created by the filter) is used to input data to the filter and/or output data from the filter. Various types of filters can be included in filter graph space 152, and new types can be dynamically added. Examples of filters include: source filters which take data from some source (e.g., a file on disk, a satellite feed, an Internet server, a VCR, etc.) and introduce it the filter graph; a transform filter which receives data, processes it, then passes it to another filter; a rendering filter which renders the data (e.g., displays video data, plays audio data, writes data to memory or a disk file, etc.); an effect filter which adds effects to the data without changing the data type; a parser filter which understands the format of the source data and how to extract the correct bytes from the data (e.g., which bytes are audio content, which bytes are video content, which bytes are data content, etc.); etc. In one implementation, the filters in filter graph space 152 conform to the DirectShow® architecture or the DirectX® architecture. Additional information regarding the DirectShow® architecture and the DirectX® architecture is available from Microsoft Corporation of Redmond, Wash.

Each of the filters in filter graph space 152 is responsible for performing a specific task(s) in the signal reception and data extraction process. The number of filters in filter graph space 152 and their respective functions are dependent on the network type(s) filter graph space 152 is intended to support (including possibly future network types). Specific examples of such filters include: a signal range selector corresponding to the hardware (e.g., for antenna selection); a frequency selector to filter particular frequencies; a demodulator to translate analog signals into digital bit streams; a packager (or tuner capturer) to separate the digital stream into packets and perform Forward Error Correction (FEC); a stream selector (or demultiplexer) to select particular packets from the stream; a stream selection filter to perform additional filtering of packets; a stream decryptor to decrypt encrypted content; an Ethernet packager to package packets into Ethernet frames; etc.

The operation of filters in filter graph space 152 in turn is controlled by network module 150 (also referred to as a "network provider"). Network module 150 is programmed with or otherwise has access to information describing the network type via which signals are received, including the manner in which audio, video, and data content are embedded in a received signal. Network module 150 interfaces with the various filters and programs them to perform their corresponding functions, including which other filters to route their outputs to, when necessary based on the network type.

Video and audio content extracted from received signals is made available to video and audio applications 146 for playback. On the other hand, data content extracted from received signals is made available to data applications 148 via network driver space 154 for presentation to a user or for other uses desired by data applications 148.

As described in more detail below, a bi-directional communication path is established between a filter(s) in filter graph space 152 and a device driver(s) in network driver space 154. Data information extracted from received signals is made available to data applications by the filter(s) in space 152 communicating the data to the driver(s) in space 154.

Additionally, one or more of data applications 148 may submit a request to tune to a particular content source. In one implementation, this request comprises a submission by the data application 148 of an IP address that it desires the data from. The IP address request is made available to filter graph space 152 by the driver in space 154 communicating the data to the filter in space 152.

The received IP address is then communicated from filter graph space 152 to network module 150. Network module 150 is pre-programmed with, or otherwise has access to, a mapping table or process from which network module 150 can determine how to configure filter graph space 152 to obtain the data from the desired address. By way of example, a particular content source may need to be tuned to, demultiplexers and decryption filters may need to be properly configured based on the source and/or network type, etc. Additionally, whatever content source is tuned to by network module 150 to obtain the data from the received address may also include audio and/or video content. In such situations, the audio and/or video content can be made available by filter graph space 152 to video and audio applications 146. Thus, it can be seen that by entry of a particular IP address by a data application 148, multimedia content including the data content as well as audio and/or video content can be received and presented to the user.

In one implementation, data content included in multimedia content received from a programming source includes a corresponding IP address. For example, the vertical blanking interval (VBI) for a particular programming source may be assigned one or more different IP addresses, a particular channel or sub-channel available from a digital satellite may be assigned one or more different IP addresses, etc. These IP address assignments are known to (or otherwise accessible to) network module 150, allowing network module 150 to properly configure filter graph space 152 in response to a request for data from a particular one of these IP addresses.

Alternatively, one or more of applications 146 may submit requests to filter graph space 152 or network module 150 to tune to a particular content source. Such a request includes an identification of the content source to be tuned to (e.g., the channel number, channel name, file name, etc.) as well as an indication of the network type via which the content source signal is received. This information is used by network module 150 and the filters in filter graph space 152 to correctly tune to the requested content source. If the multimedia content from the requested content source includes data content, then it may also be made available to data applications 148 even though an application 148 did not specifically request it.

Figure 3:
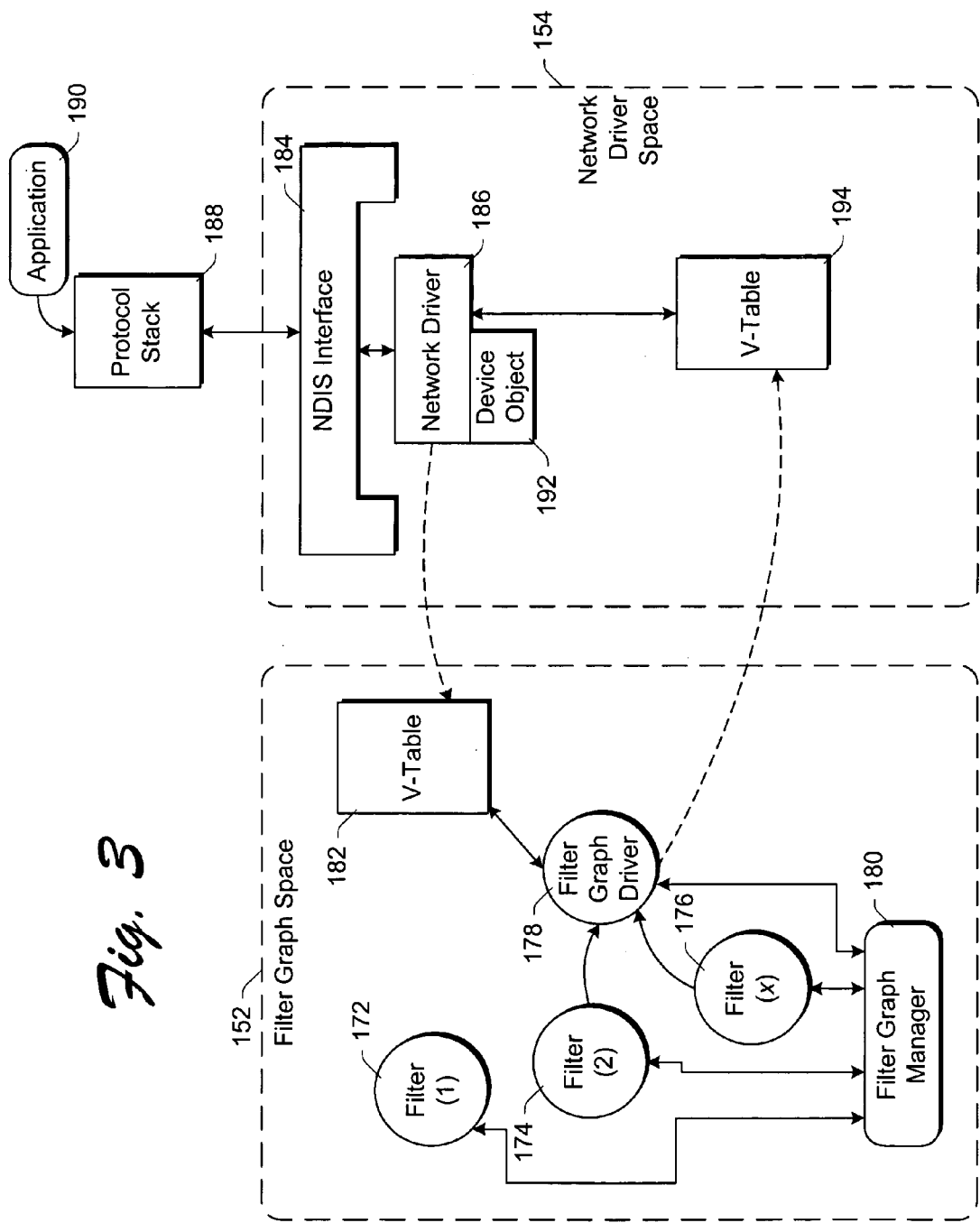
FIG. 3 is a block diagram illustrating exemplary filter graph and network driver spaces in accordance with certain embodiments of the invention.

FIG. 3 is a block diagram illustrating exemplary filter graph and network driver spaces in accordance with certain embodiments of the invention. Filter graph space 152 includes multiple (x) filters 172, 174, and 176. The specific function(s) performed by filters 172–176 varies dependent on the network type and/or source that the multimedia is being received from, as discussed above. Filter graph driver 178 is also one of the filters in filter graph space 152. Filter graph driver 178 receives data from other filters (filters 174 and 176 in the illustrated example) and passes the data to network driver space 154.

Filter graph space 152 also includes a filter graph manager 180 that connects filters 172–178 to one another and controls the media stream. Filter graph manager 180 may be pre-configured with certain connections for filters 172–178 to receive and render multimedia content from various network types and sources, and/or may dynamically determine such configurations.

Filter graph space 152 further includes a filter graph virtual function table (V-Table) 182. In the illustrated example, V-Table 182 is created by filter graph driver 178. V-Table 182 corresponds to filter graph driver 178 and includes identifiers (e.g., addresses) of each function of filter graph driver 178 that can be called or invoked by another filter 172–176 to handle various events while device driver 178 is operational. As discussed in more detail below, V-Table 182 is also made accessible to network driver space 154. Table I below illustrates exemplary functions identified in V-Table 182.

TABLE I

| Function | Description |
| --- | --- |
| StreamIPIndicateEvent | Allows network device driver 186 to signal an event to filter graph device driver 178. Examples of events that can be signaled include a change in Multicast address list, a change in status of the driver (e.g., shutdown, pause, hibernation, etc.), a change in an identifier of the driver, etc. |
| SetMulticastAddress | Allows network device driver 186 to send the current Multicast address list to filter graph device driver 178, identifying which address to receive data content from. |

Network driver space 154 includes an NDIS-compliant interface 184 that provides an interface between a network virtual device driver 186 and protocol stack 188. In the illustrated example, protocol stack 188 is a Transmission Control Protocol/Internet Protocol (TCP/IP) stack for communicating packets of IP data. Alternatively, data transfer protocols other than IP can be used.

Network driver 186 is referred to as a "virtual" device driver because there is no corresponding underlying hardware; rather device driver 186 is used to establish and maintain a communication path between network driver space 154 and filter graph space 152. An application 190 (such as one of data applications 148 of FIG. 2) can connect to protocol stack 188, which in turn can communicate with virtual device driver 186 via NDIS interface 184.

Network driver space 154 may also include other device drivers which can pass data received from sources other than filter graph space 152 to protocol stack 188. However, these additional device drivers have not be shown so as to avoid cluttering the drawing.

In the illustrated example, network driver 186 is also referred to as a "miniport", with many operations being provided by interface 184 rather than being programmed into driver 186. Alternatively, network driver 186 may be a "full" driver, relying very little on interface 184 (e.g., only to ensure that packets received from driver 186 are passed to the proper protocol stack).

Network driver 186 includes a corresponding device object 192 which is used to establish a communication link between filter graph space 152 and network driver space 154. Network driver space 154 further includes a network V-Table 194 which includes identifiers (e.g., addresses) of one or more functions of network driver 186 that can be called by other device drivers or components to handle various events while network driver 186 is operational. As discussed in more detail below, V-Table 194 is made accessible to filter graph driver 178. In the illustrated example, V-Table 194 is created by network driver 186. Table II below illustrates exemplary functions identified in V-Table 194.

TABLE II

| Function | Description |
| --- | --- |
| IndicateFrame | Indicates frame of IP data to network driver 186. An Indicate handler function copies the received data to local buffers and indicates these buffers up the TCP/IP protocol stack. The Indicate handler also does some checking on the stream to validate the data stream is actually composed of IP datagrams. If a stream is not IP, the data is ignored. |
| IndicateStatus | Signals network device driver 186 that a Stream class event has occurred. |
| QueryStats | Returns various statistics to the caller. These statistics include frames received, packets indicated, etc. |

Generally, requests to access device drivers via NDIS interface 184 are received as I/O request packets (IRPs) by interface 184. Interface 184 interprets the packets and determines which function of which device driver in network driver space 154 should be invoked to handle the request. Once this determination is made, the request is dispatched to the appropriate function of the appropriate device driver.

NDIS interface 184 does not support full access of the device drivers in network driver space 154 by filters in filter graph space 152. Selected I/O request packets from filter graph driver 178 of filter graph space 152 are communicated by interface 184 to network driver 186, such as an open I/O request packet or a close I/O request packet. However, passing of IP data from filter graph space 152 to network driver space 154 is not understood by NDIS interface 184 and such a request would be ignored or refused by interface 184.

As described in more detail below, a communication path between filter graph space 152 and network driver space 154 is established by taking advantage of these selected I/O request packets to exchange address of the V-Tables 182 and 194. Once filter graph driver 178 has the address of V-Table 194, filter graph driver 178 can directly access the functionality of network driver 186 using V-Table 194 and bypassing the dispatching of NDIS interface 184.

Figure 4:
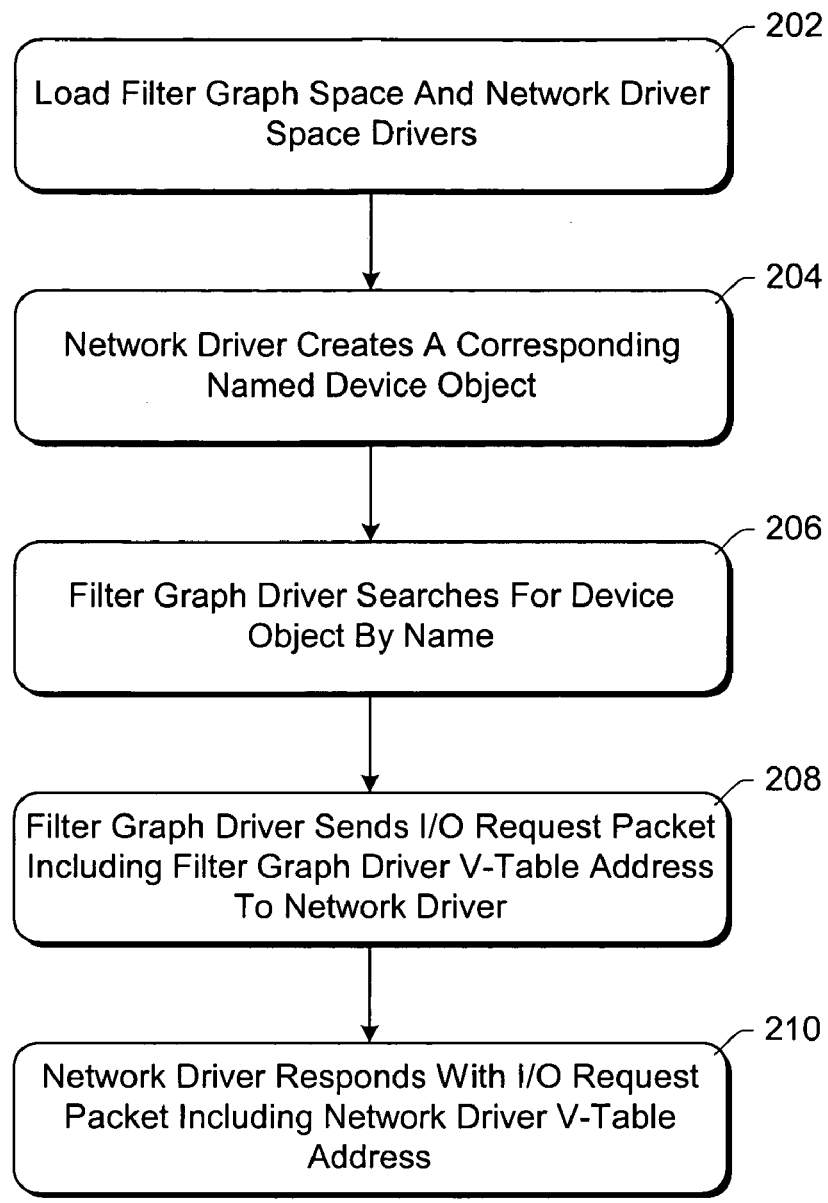
FIG. 4 is a flowchart illustrating an exemplary process for establishing a communication path between a filter graph space and a network driver space in accordance with certain embodiments of the invention.

FIG. 4 is a flowchart illustrating an exemplary process for establishing a communication path between a filter graph space and a network driver space in accordance with certain embodiments of the invention. The process of FIG. 4 may be performed in software, firmware, hardware, or a combination thereof. FIG. 4 is described with additional reference to elements of FIG. 3.

Initially, drivers are loaded into both filter graph space 152 and network driver space 154 (act 202). The driver loaded into filter graph space 152 is filter graph driver 178, and the driver loaded into network driver space 154 is network driver 186.

Once loaded, network driver 186 creates a corresponding named device object 192 (act 204). Filter graph driver 178 is aware of the name of device object 192 (e.g., is pre-programmed with the name) and once loaded initiates a search for device object 192 by name (act 206). The search may be initiated as soon as filter graph driver 178 is loaded, or alternatively in response to a request to establish the communication path (e.g., a request or command from filter graph manager 180).

Filter graph driver 178 performs its search by submitting an I/O request packet to the operating system (e.g., that is common to both filter graph space 152 and network driver space 154). The response from the operating system to such an I/O request packet depends on whether the named device object has been created yet. If the named device object has not yet been created, then the operating system either ignores the request or responds that the named device object does not exist. Filter graph driver 178 continues submitting I/O request packets until it receives a response from the operating system indicating that the named device object has been created and can be opened for I/O.

When the named device object has been created, filter graph driver 178 queries the operating system for the device object 192. An IO Request Packet (IRP) is sent to the device object 192 from the filter driver 178, containing a pointer to (e.g., the address of) the V-Table 182 of FIG. 3 (act 208). Upon receipt of this IO Request Packet, the device object 192 retrieves the V-Table address 182 of the filter graph driver 178. This V-Table pointer allows the NDIS driver 186 and device object 192 to directly access the filter graph driver 178 functions defined in the V-Table 182.

The device object 192 responds to the filter graph driver's IO Request with the address of the V-Table corresponding to the NDIS device driver, which is network V-Table 194 of FIG. 3 (act 210). Upon receipt of this response, filter graph driver 178 has a pointer to (e.g., an address of) network V-Table 194, thereby allowing filter graph device driver 178 to access the functions identified by V-Table 194. With such a pointer, filter graph device driver 178 can access V-Table 194 directly and avoid sending requests to NDIS interface 184 or having requests intercepted by NDIS interface 184.

Returning to FIG. 3, once the addresses of V-Tables 182 and 194 are exchanged, a bi-directional communication path between filter graph space 152 and network driver space 154 is established. Filter graph driver 178 can pass requests and data to network driver space 154 by invoking a function(s) identified in network V-Table 194, and network driver 186 can similarly pass requests and data to filter graph space 152 by invoking a function(s) identified in filter graph V-Table 182.

Figure 5:
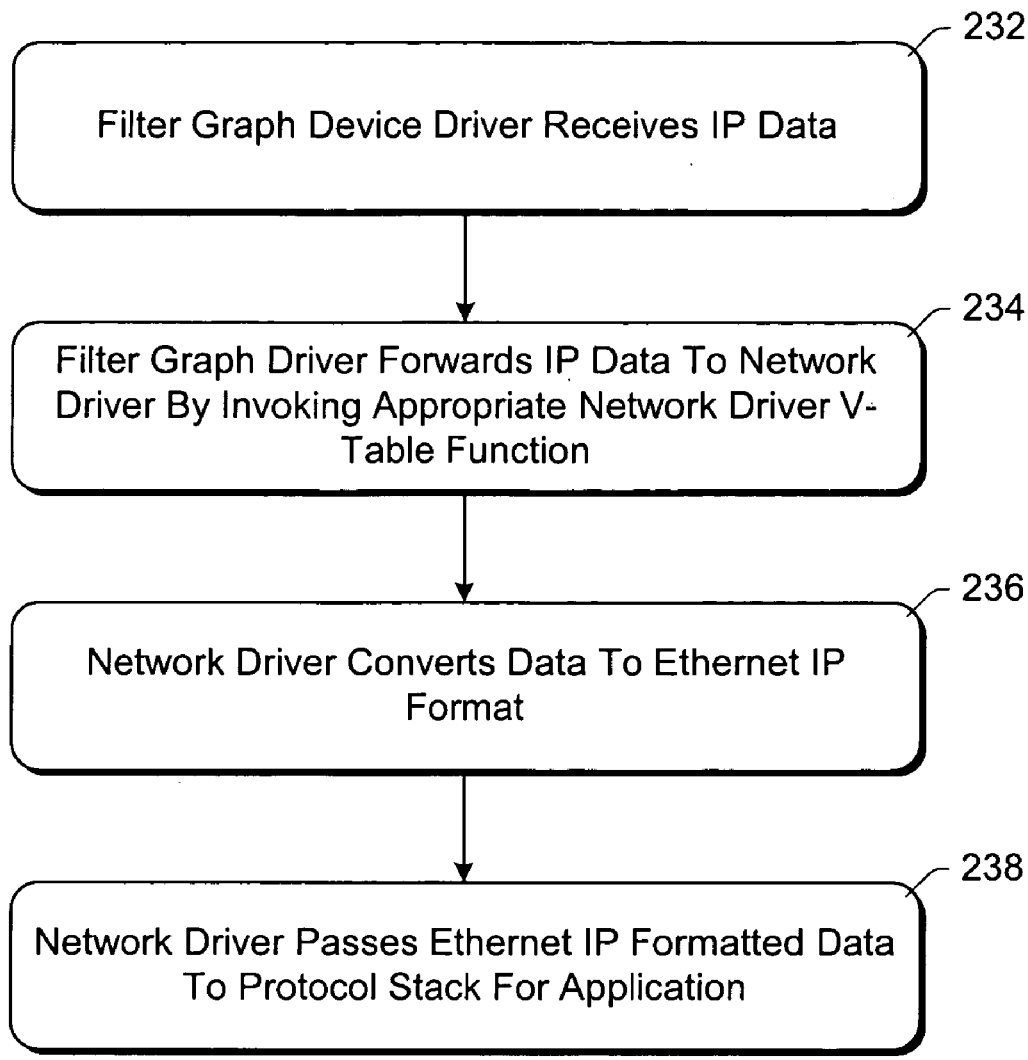
FIG. 5 is a flowchart illustrating an exemplary process for passing data from a filter graph space to a network driver space in accordance with certain embodiments of the invention.

FIG. 5 is a flowchart illustrating an exemplary process for passing data from a filter graph space to a network driver space in accordance with certain embodiments of the invention. The process of FIG. 5 may be performed in software, firmware, hardware, or a combination thereof. FIG. 5 is described with additional reference to elements of FIG. 3.

IP data is received into a source filter in filter graph space 152 and is eventually passed to filter graph driver 178 (act 232). Upon receipt of the IP data, filter graph device driver 178 forwards the IP data to network device driver 186 by invoking the appropriate function (e.g., an IndicateFrame function) identified in network V-Table 194 (act 234).

Network driver 186 receives the IP data from filter graph driver 178 and converts it to an Ethernet IP format (act 236). Alternatively, this conversion could have occurred by a filter in filter graph space 152, thereby alleviating network driver 186 of the burden of converting the data. Once the data is in the Ethernet IP format, network driver 186 passes the Ethernet IP formatted data to protocol stack 188 via NDIS interface 184 (act 238). Once the data is passed to protocol stack 188, it is accessible to application 190. The passing of data from an NDIS-compatible device driver to a protocol stack via an NDIS interface and the retrieval of such data from the protocol stack by an application are well-known to those skilled in the art and thus will not be discussed further except as they pertain to the invention.

The process of FIG. 5 repeats as new data content is received into filter graph space 152, which can result in a continual stream of data from filter graph space 152 to network driver space 154.

Figure 6:
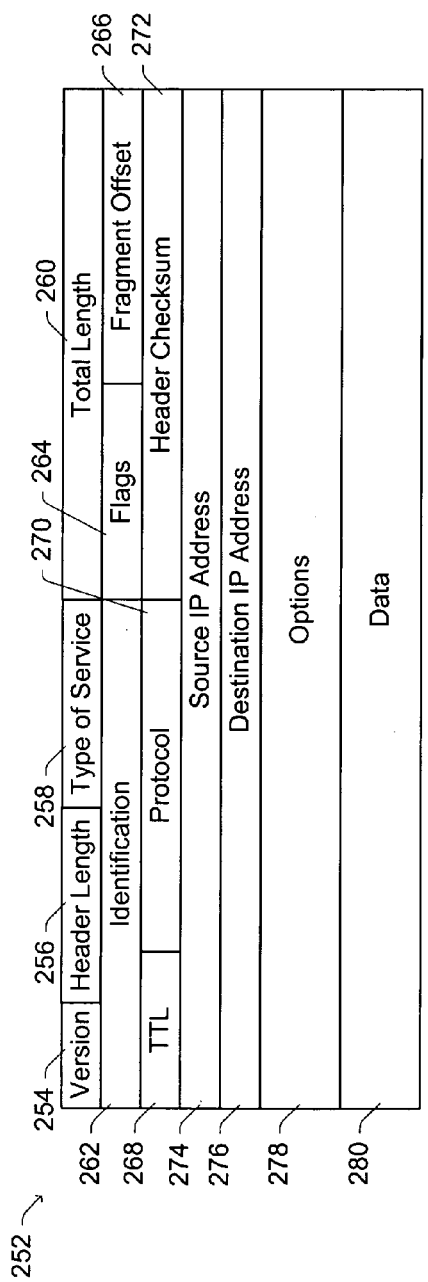
FIG. 6 is a block diagram illustrating an exemplary IP data packet in accordance with certain embodiments of the invention.

The IP formatted data is transferred from filter graph driver 178 to network driver 186 in data packets. FIG. 6 is a block diagram illustrating an exemplary IP data packet in accordance with certain embodiments of the invention. The IP data packet 252 has a header portion including a version field 254, a header length field 256, a type of service field 258, a total length field 260 (the length of the header fields plus data fields), an identification field 262, a flags field 264, a fragment offset field 266, time to live (TTL) field 268, a protocol field 270, a header checksum field 272, a source IP address 274, a destination IP address 276, and an options field 278. IP data packet 252 also includes data field 280, including between 46 and 1500 bytes of data.

Figure 7:
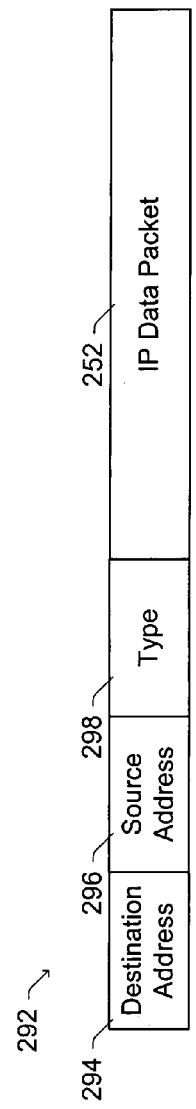
FIG. 7 is a block diagram illustrating an exemplary Ethernet IP format packet in accordance with certain embodiments of the invention.

The IP data packet 252 is converted to an Ethernet packet form, as discussed above, by network device driver 186. FIG. 7 is a block diagram illustrating an exemplary Ethernet IP format packet in accordance with certain embodiments of the invention. The Ethernet IP format packet 292 includes an Ethernet destination address field 294, an Ethernet source address field 296, a type field 298, and IP data packet 252 of FIG. 6.

Figure 8:
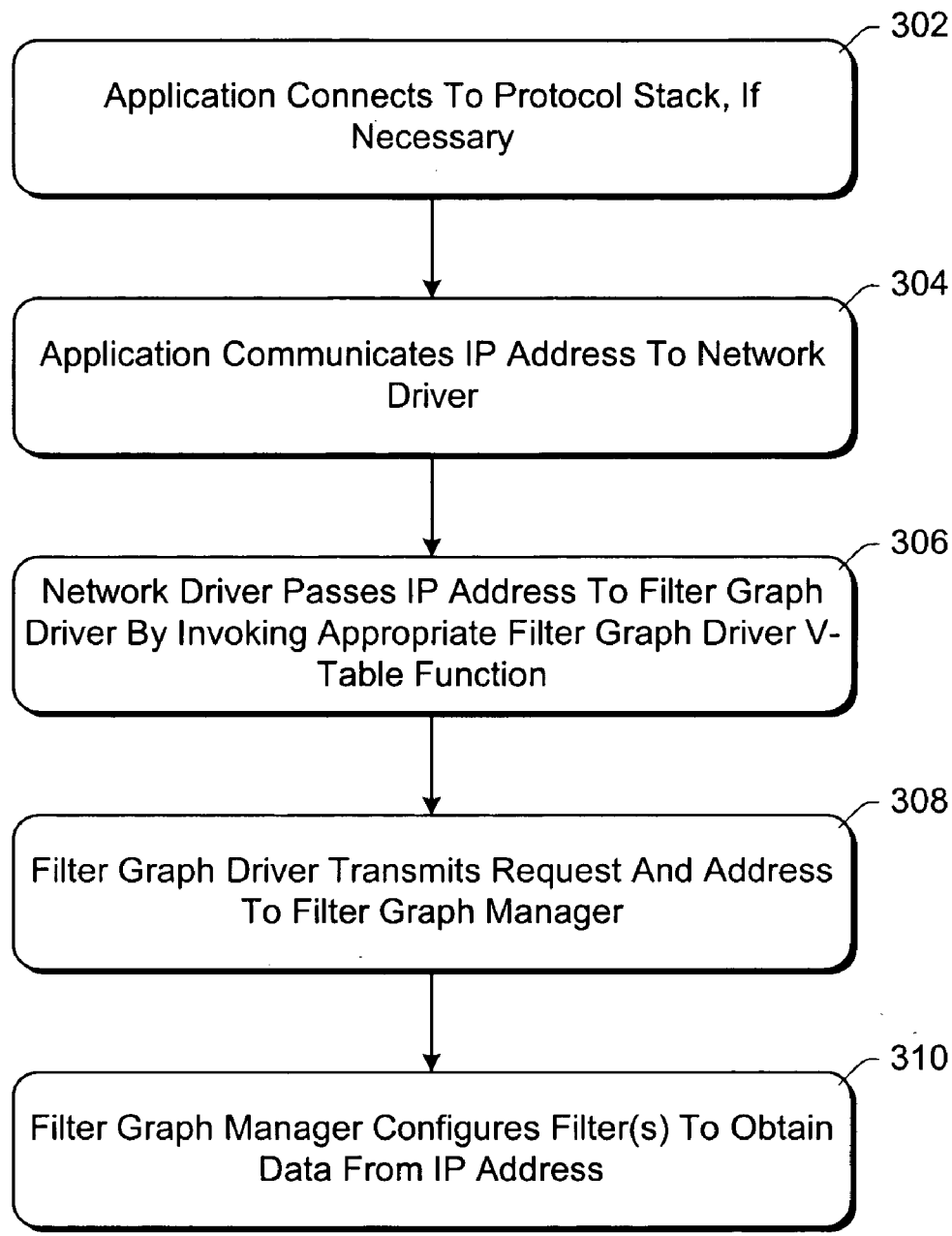
FIG. 8 is a flowchart illustrating an exemplary process for passing a request from a network driver space to a filter graph space in accordance with certain embodiments of the invention.

In addition to passing data to network driver 186, the bi-directional communication path between filter graph space 152 and network driver space 154 further allows requests to be passed from network driver space 154 to filter graph space 152. FIG. 8 is a flowchart illustrating an exemplary process for passing a request from a network driver space to a filter graph space in accordance with certain embodiments of the invention. The process of FIG. 8 may be performed in software, firmware, hardware, or a combination thereof. FIG. 8 is described with additional reference to elements of FIGS. 2 and 3.

Initially, an application 190 desiring to receive IP data from a particular IP address connects to protocol stack 188 (act 302). Alternatively, if the connection has been previously established then act 302 is not necessary. Once the connection is established, application 190 passes an IP address request to network driver 186 (act 304). The IP address request is a request to receive IP data from the IP address indicated in the request. The request is passed through protocol stack 188 and NDIS interface 184 in a conventional manner to network driver 186.

Upon receipt of the request, network driver 186 passes the IP address to filter graph driver 178 by invoking the appropriate function (e.g., a SetMulticastAddress function) identified in filter graph V-Table 182 (act 306). Filter graph device driver 178 receives the IP address and passes the IP address along with a request to obtain the data from that IP address to filter graph manager 180 (act 308). Filter graph manager 180 in turn configures the filters 172–176 to tune to the appropriate multimedia content source and extract the requested IP data from the signal tuned to (act 310). Filter graph manager 180 may perform the configuration on its own, or alternatively may collaborate with network module 150 of FIG. 2.

Returning to FIG. 3, multiple different components or drivers may attempt to access V-Tables 182 and 194 concurrently. For example, two different portions (e.g., functions) of filter graph driver 178 may attempt to invoke a function of filter graph V-Table 182 at the same time. In order to maintain the integrity of the V-Tables, a security mechanism is implemented to allow only one component or driver to access the V-Tables at a time. In one implementation, a spin lock is used to maintain such "one user at a time" security. The spin lock is used by requiring the component or driver attempting to access one of the V-Tables to obtain the spin lock corresponding to that V-Table in order to access the V-Table. This spin lock is handed out to only one component or driver (or function thereof) at a time. If the spin lock is already handed out to another component or driver, then the new component or driver requesting the spin lock has to wait until the spin lock is available. When a component or driver has the spin lock, the component or driver can invoke functions identified in the corresponding V-Table. Otherwise, the component or driver cannot invoke such functions. In one implementation, the drivers accessing V-tables use their own internal spin locks so that only one function of the driver can access the V-table at a time. Alternatively, the V-tables themselves could include functions to obtain and release the spin locks, or a single spin lock could be used to control access to both V-tables.

Additionally, in order for network device driver 186 to pass Ethernet formatted data up to TCP/IP protocol stack 188, network driver 186 binds with NDIS interface 184. Network device driver 186 defines an NDIS dispatch table for the binding at DriverEntry time (i.e., when the driver is loaded into the system, initializing any necessary objects and setting up any necessary system resources). Table III below identifies the dispatch functions in the NDIS dispatch table in one exemplary implementation.

TABLE III

| Function | Description |
|---|---|
| HaltHandler | This function allows the driver to be halted. |
| InitializeHandler | This function allows the driver to be initialized. |
| QueryInformationHandler | This function allows the NDIS interface to query the driver for information and status. Supported OID's (Object Identifiers) are:<br>OID_GEN_MAC_OPTIONS:<br>    NDIS_MAC_OPTION_TRANSFERS_NOT_PEND,<br>    NDIS_MAC_OPTION_RECEIVE_SERIALIZED<br>    NDIS_MAC_OPTION_COPY_LOOKAHEAD_DATA<br>    NDIS_MAC_OPTION_NO_LOOPBACK<br>OID_GEN_SUPPORTED_LIST:<br>    returns a list of supported OID's<br>OID_GEN_MEDIA_SUPPORTED:<br>OID_GEN_MEDIA_IN_USE:<br>    Returns the NDIS media type<br>OID_GEN_MAXIMUM_LOOKAHEAD:<br>    1500 bytes<br>OID_GEN_MAXIMUM_SEND_PACKETS:<br>    1<br>OID_GEN_MAXIMUM_FRAME_SIZE:<br>    1500<br>OID_GEN_MAXIMUM_TOTAL_SIZE:<br>    1540<br>OID_GEN_LINK_SPEED:<br>    6000000)<br>OID_GEN_TRANSMIT_BUFFER_SPACE:<br>    1540<br>OID_GEN_RECEIVE_BUFFER_SPACE:<br>    20 times the max packet size of 1540<br>OID_GEN_TRANSMIT_BLOCK_SIZE:<br>    1500 bytes<br>OID_GEN_RECEIVE_BLOCK_SIZE:<br>    1540<br>OID_GEN_DRIVER_VERSION:<br>    Driver Version<br>OID_GEN_CURRENT_LOOKAHEAD:<br>    1540<br>OID_802_3_MULTICAST_LIST:<br>    Returns the current multicast list<br>OID_GEN_CURRENT_PACKET_FILTER:<br>    Returns pointer to current packet filter<br>OID_802_3_PERMANENT_ADDRESS:<br>    Returns permanent address.<br>OID_802_3_CURRENT_ADDRESS:<br>    Returns station address<br>OID_802_3_MAXIMUM_LIST_SIZE:<br>    Returns the multicast list size<br>OID_GEN_XMIT_OK:<br>OID_GEN_RCV_OK:<br>OID_GEN_XMIT_ERROR:<br>OID_GEN_RCV_ERROR:<br>OID_GEN_RCV_NO_BUFFER:<br>OID_802_3_RCV_ERROR_ALIGNMENT:<br>OID_802_3_XMIT_ONE_COLLISION:<br>OID_802_3_XMIT_MORE_COLLISIONS:<br>    Returns 0 |
| ResetHandler | This function allows the driver to be reset. |
| SetInformationHandler | The SetInformation function allows the NDIS interface to pass command information and data to the minidriver. Supported OID's are:<br>OID_802_3_MULTICAST_LIST:<br>As part of processing the OID_802_3_MULTICAST_LIST OID command code, a multicast list will be passed to the minidriver by NDIS (an IP address list that is passed to filter graph driver 178). The Multicast list is formatted as a list of DWORDS. The number of multicast addresses in the multicast list is determined by dividing the size of the Query Information call buffer length parameter by the size of a DWORD. The multicast list is sent to the network provider minidriver via the net provider interface. This interface is defined later in this document.<br>OID_GEN_PROTOCOL_OPTIONS:<br>OID_GEN_CURRENT_PACKET_FILTER: |

TABLE III-continued

| Function | Description |
| --- | --- |
| ReturnPacketHandler | Returns the Indicated Ethernet IP packets back to the miniports packet pool, and makes those frames available for reuse |

Similarly, in order for filter graph device driver 178 to receive IP Data from upstream filters, filter graph device driver 178 binds with Streaming Class driver (e.g., filter graph manager 180), defining a Streaming Class dispatch table for the binding at DriverEntry time. Alternatively, AVStreaming may be used. Additional information regarding AVStreaming is available from Microsoft Corporation of Redmond, Wash. Table IV below identifies the dispatch functions in the Streaming Class dispatch table one exemplary implementation.

TABLE IV

| Function | Description |
| --- | --- |
| Interrupt Handler | NULL |
| ReceiveDevice Handler | Processes the following SRB (Stream Request Block) requests: <br> SRB_INITIALIZE_DEVICE <br> Request to initialize the filter graph driver. The driver will define its internal structure, frame pools and queues. The driver will also attempt to establish a link with the virtual device driver. <br> SRB_OPEN_DEVICE_INSTANCE <br> This request is sent to the filter graph driver to open another instance of the driver. <br> SRB_CLOSE_DEVICE_INSTANCE <br> Close the previously opened device instance. <br> SRB_GET_STREAM_INFO <br> The filter graph driver builds a HW_STREAM_HEADER structure and fills it in with information about the streams that it supports. Since from the Kernel streaming point of view this is an IP sink, the stream type will be IP Sink formatted IP frames. <br> SRB_OPEN_STREAM <br> This command is a request to open the filter graph driver IP stream. The filter graph driver will determine if the stream can be opened. If the stream can be opened, the HW_STREAM_OBJECT will be updated. <br> SRB_READ_DATA <br> This request signals that IP Data frames are available for processing by the filter graph driver. <br> SRB_CLOSE_STREAM <br> Close the previously opened stream. |
| Cancel Handler | Called to abort the currently active SRB. |
| RequestTimeout Handler | Called when an SRB has timed out. |
| ReceiveStreamData Handler | Entry point for receiving a data transfer. The buffers of data received on the SRB_WRITE case are passed to the network driver which parses the stream and indicates the data up the TCP/IP stack. |
| ReceiveStreamControl Handler | Entry point for receiving a control transfer. |
| Reset Handler | Called when the filter graph driver needs to be reset. |

FIG. 9 shows a general example of a computer 342 that can be used in accordance with the invention. Computer 342 is shown as an example of a computer that can perform the functions of rendering system 102 and/or receiver 106 of FIG. 1, or system 140 of FIG. 2. Computer 342 includes one or more processors or processing units 344, a system memory 346, and a system bus 348 that couples various system components including the system memory 346 to processors 344.

The bus 348 represents one or more of any of several types of bus structures, including a memory bus or memory controller, a peripheral bus, an accelerated graphics port, and a processor or local bus using any of a variety of bus architectures. The system memory includes read only memory (ROM) 350 and random access memory (RAM) 352. A basic input/output system (BIOS) 354, containing the basic routines that help to transfer information between elements within computer 342, such as during start-up, is stored in ROM 350.

Computer 342 further includes a hard disk drive 356 for reading from and writing to a hard disk, not shown, connected to bus 348 via a hard disk driver interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 that is coupled to the system bus. A monitor 384 or other type of display device is also connected to the system bus 348 via an interface, such as a video adapter 386. In addition to the monitor, personal computers typically include other peripheral output devices (not shown) such as speakers and printers.

Computer 342 optionally operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 9. The logical connections depicted in FIG. 9 include a local area network (LAN) 392 and a wide area network (WAN) 394. Such networking environments are commonplace in offices, enterprise-wide computer networks, intranets, and the Internet. In the described embodiment of the invention, remote computer 388 executes an Internet Web browser program such as the "Internet Explorer" Web browser manufactured and distributed by Microsoft Corporation of Redmond, Wash.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Computer 342 also includes one or more broadcast tuners 200. Broadcast tuner 200 receives broadcast signals either directly (e.g., analog or digital cable transmissions fed directly into tuner 200) or via a reception device (e.g., via antenna 310 or satellite dish 314 of FIG. 1).

Generally, the data processors of computer 342 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data process or(s) of the computer.

CONCLUSION

Thus, coupling together of a filter graph space and a network driver space has been described. A bi-directional communication path between the filter graph space and the network driver space is advantageously established, allowing data and requests to be passed between filters in the filter graph space and device drivers in the network driver space. By establishing such a bi-directional communication path, applications can request and receive data from a filter graph space in the same manner as they request and receive data from the network driver space, needing little or no knowledge that the data is being received from the filter graph space.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A system comprising:
   a filter graph space including a plurality of filters;
   a network driver space including a plurality of network drivers;
   a filter graph virtual function table corresponding to a filter graph driver which is one of the plurality of filters;
   a network virtual function table corresponding to a network driver which is one of the plurality of network drivers;
   wherein the network driver is operable to pass requests to the filter graph space by accessing the filter graph virtual function table; and
   wherein the filter graph driver is operable to pass data to the network driver space by accessing the network virtual function table.

2. A system as recited in claim 1, wherein each of the plurality of filters is compliant with the DirectShow® architecture.

3. A system as recited in claim 1, wherein each of the plurality of network drivers is compliant with the Network Device Interface Specification (NDIS).

4. A system as recited in claim 1, wherein the system further comprises a protocol stack communicatively coupled to the network driver space, and wherein an application connected to the protocol stack can control one of the plurality of filters by passing a request to the filter graph space via the protocol stack and the network driver.

5. A system as recited in claim 1, wherein the network virtual fiction table includes a security function that can be invoked to allow only one driver or filter to access the network virtual function table at a time.

6. A system as recited in claim 5, wherein the security function comprises a spin look function.

7. A method of establishing a communication path between a filter graph space and a network driver space in a system, the method comprising:
   a filter graph driver and a network driver each determining that the other is loaded in the system, wherein the filter graph driver is part of the filter graph space graph and the network driver is part of the network driver space;
   passing, from the filter graph driver to the network driver, an identifier of a filter graph driver function table corresponding to the filter graph driver, thereby allowing the network driver to access functions in the filter graph driver function table; and
   passing, from the network driver to the filter graph driver, an identifier of a network driver function table corresponding to the network driver, thereby allowing the filter graph driver to access functions in the network driver function table.

8. A method as recited in claim 7, wherein the identifiers of the function tables comprise addresses.

9. A method as recited in claim 7, wherein each function table including addresses of a plurality of functions of the corresponding driver.

10. A method as recited in claim 7, wherein the filter graph driver determines that the network driver is loaded in the system by searching for a name of a device object corresponding to the network driver.

11. A method as recited in claim 10, wherein the passing the identifier of the network driver function table comprises sending, to the filter graph driver, an input/output (I/O) request packet in response to the searching, wherein the I/O request packet includes the identifier of the network driver function table.

12. A method as recited in claim 7, wherein the network driver determines that the filter graph driver is loaded in the system by receiving, from the filter graph driver, an input/output (I/O) request packet from the filter graph driver.

13. A method as recited in claim 7, wherein the filter graph driver function table includes a function to allow the network driver to signal an event to the filter graph driver.

14. A method as recited in claim 7, wherein the filter graph driver function table includes a function to allow the network driver to send a multicast address list to the filter graph driver.

15. A method as recited in claim 7, wherein the network driver function table includes a function to allow the filter graph driver to indicate a frame of Internet Protocol (IP) data to the network driver.

16. A method as recited in claim 7, wherein the network driver function table includes a function to allow the filter graph driver to indicate to the network driver that an event has occurred.

17. A method as recited in claim 7, wherein the network driver function table includes a function to allow the filter graph driver to obtain statistics regarding data that has been received by the network driver.

18. A method as recited in claim 7, wherein the network driver function table includes a function to allow the filter graph driver to lock the network driver function table and prevent other components from accessing the filter graph driver while locked.

19. A method as recited in claim 7, wherein the network driver function table includes a function to allow the filter graph driver to unlock the network driver function table and allow other components to access the network driver function table.

20. One or more computer-readable memories containing a computer program that is executable by a processor to perform the method recited in claim 7.

21. A method of coupling a filter graph space to a network driver space, the method comprising:
    making a filter driver in the filter graph space and a network driver in the network driver space aware of each other; and
    establishing bi-directional communication between the filter driver and the network driver by the filter driver and network driver exchanging identifiers of their corresponding virtual function tables, wherein the virtual function table corresponding to the filter driver includes addresses of a plurality of functions that can be invoked by the network driver, and wherein the virtual function table corresponding to the network driver includes addresses of a plurality of functions that can be invoked by the filter.

22. One or more computer-readable memories containing a computer program that is executable by a processor to perform the method recited in claim 21.

23. One or more computer-readable media having stored thereon a computer program that, when executed by one or more processors of a computer, causes the one or more processors to perform acts including:
    receiving, from an application via a protocol stack and a network interface, a request to tune to a particular multimedia source;
    invoking a function of a filter graph driver to communicate the request to a filter graph space, wherein the function is identified in a virtual function table corresponding to the filter graph driver;
    receiving, from the filter graph driver, data in response to the request;
    returning the data to the application; and
    converting, prior to returning the data to the application, the data received in an Internet Protocol (IP) format to an Ethernet IP format.

24. One or more computer-readable media as recited in claim 23, wherein the computer program is implemented as a device driver compliant with the Network Device Interface Specification.

25. One or more computer-readable media having stored thereon a computer program that, when executed by one or more processors of a computer, causes the one or more processors to perform acts including:
    receiving from a device driver, an address of data:
    communicating the address to a filter graph manager by invoking a function identified in a virtual function table corresponding to the device driver;
    receiving data, obtained via the address, from a filter in a filter graph; and
    passing the data to a device driver compliant with the Network Device Interface Specification and to which a bi-directional communication path exists.

26. One or more computer-readable media as recited in claim 25, wherein the computer program is compliant with the DirectShow® architecture.

* * * * *